Patented May 24, 1927.

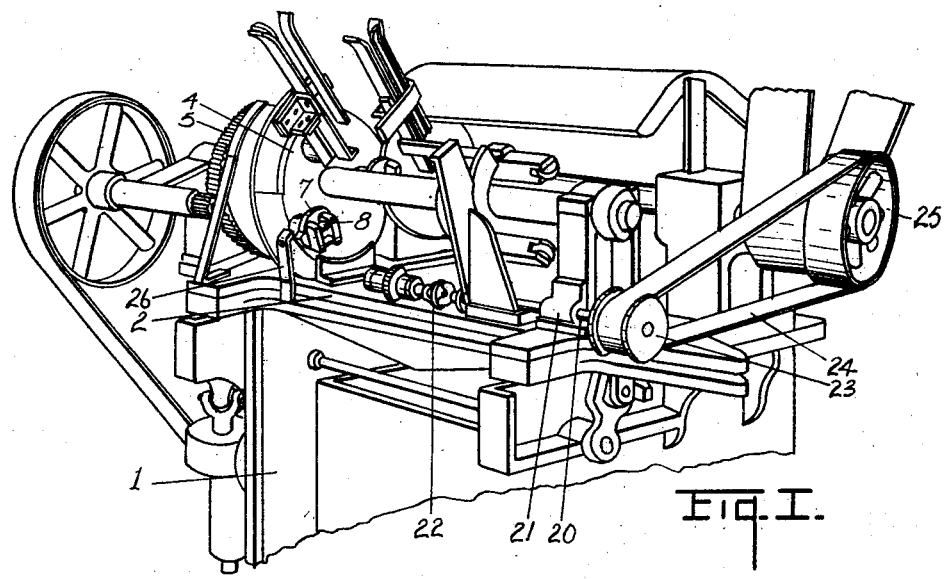
Fig. I.
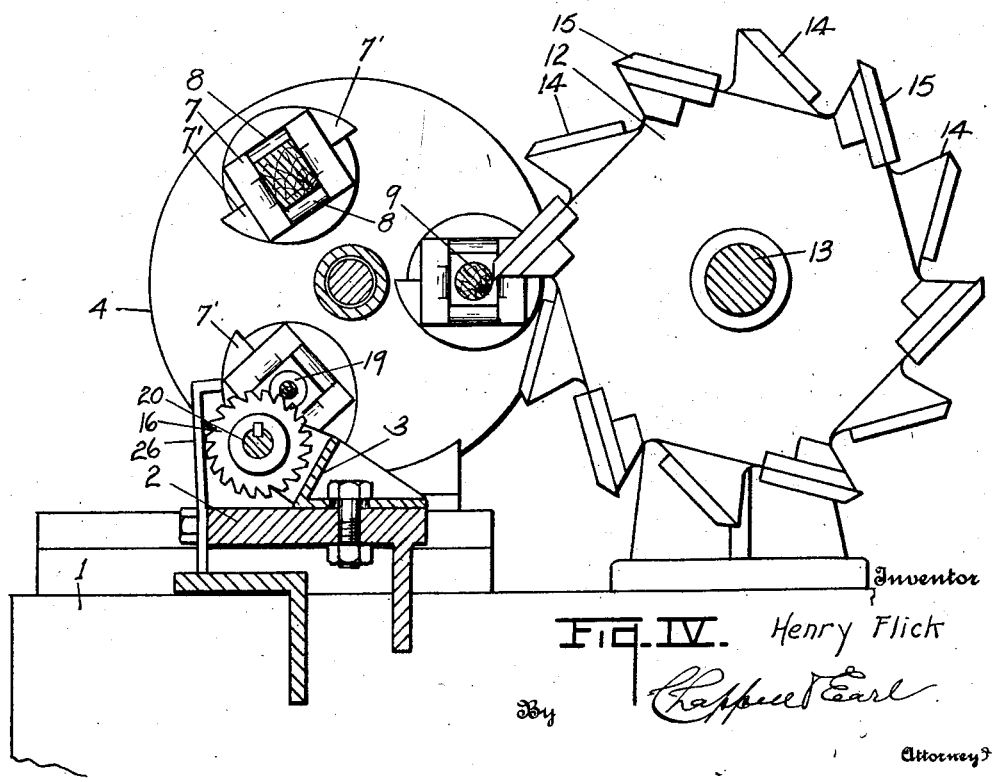
Fig. IV.
Inventor
Henry Flick
By Chappell Earl
Attorney

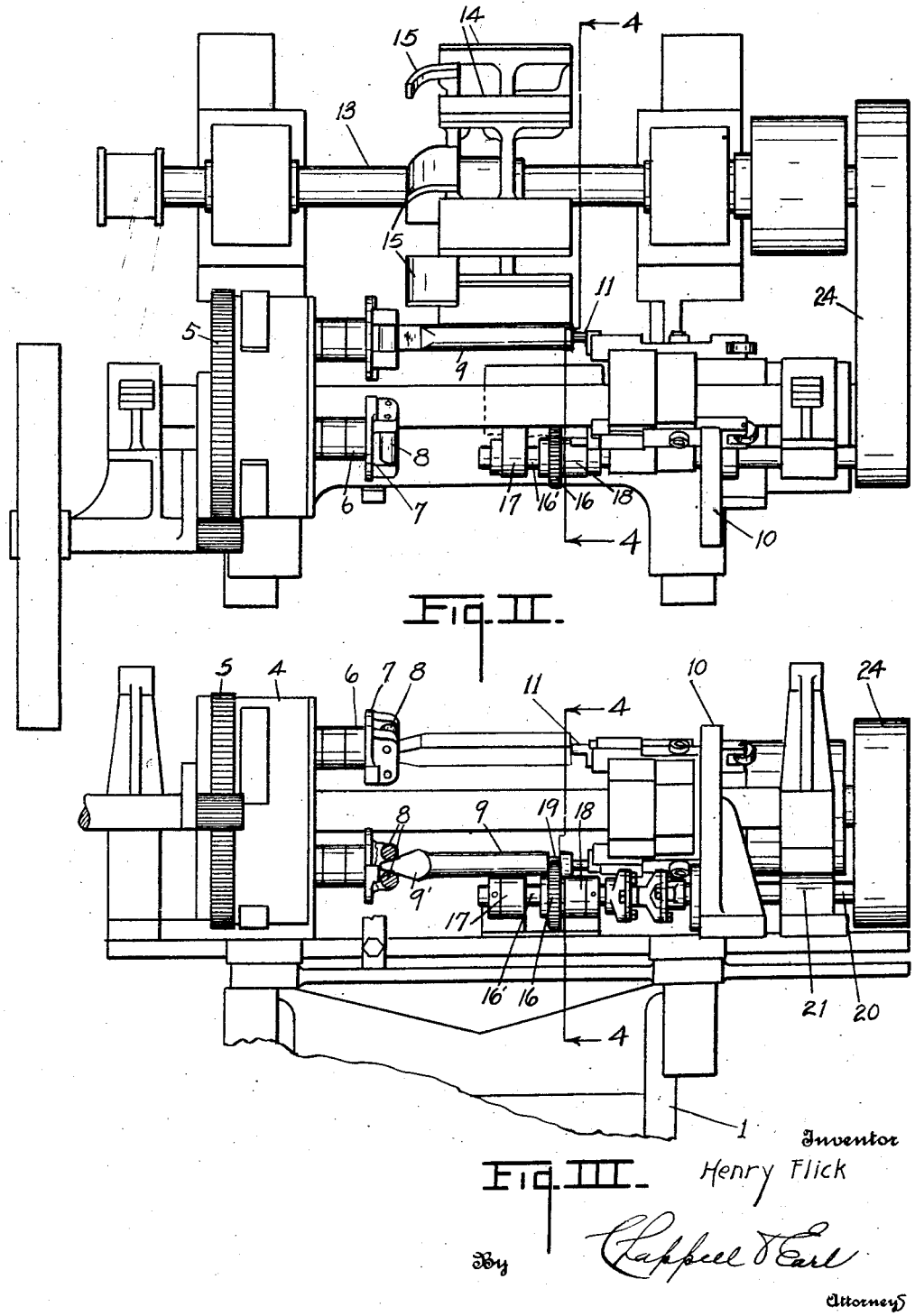

1,629,691

UNITED STATES PATENT OFFICE.

HENRY FLICK, OF JACKSON, MICHIGAN, ASSIGNOR TO HAYES WHEEL COMPANY, OF JACKSON, MICHIGAN.

SPOKE-TURNING LATHE.

Application filed October 4, 1921. Serial No. 505,248.

This invention relates to improvements in spoke turning lathes, it being in the nature of an addition and attachment to the structure of Patent No. 1,252,271, issued January 1, 1918, to the Hayes Wheel Company as assignee of William Kistler and Arthur L. Butcher.

The objects of the invention are,

First, to provide in a spoke lathe of this class improved clutch means providing reference for accurately finishing the spoke.

Second, to provide in such a lathe improved means of forming the tenon of the spoke.

Further objects and objects relating to details and economies of construction and operation will definitely appear from the detailed description to follow.

The objects of the invention are accomplished by the devices and means described in the following specification. The invention is clearly defined and pointed out in the claims. A structure constituting a preferred embodiment of the invention is clearly illustrated in the accompanying drawing, forming a part of this specification, in which:

Fig. I is a perspective view showing a complete spoke turning lathe with the invention incorporated.

Fig. II is a plan view of the lathe, the cover portion, magazine and unnecessary details being omitted.

Fig. III is a detail elevation view from the front of Figs. I and II.

Fig. IV is an enlarged detail sectional view taken on line 4—4 of Figs. II and III, looking in the direction of the little arrows.

In the drawings similar numerals of reference refer to similar parts throughout the several views.

Considering the numbered parts of the drawings by the numbers. 1 is the frame of the machine provided with a bed member 2 which is mounted to oscillate on the ways 3 supported by the said frame. The same is pivoted in the manner described in the said Patent No. 1,252,271, and is adjustable as there indicated.

The headstock 4 is carried by the said bed plate and driven by suitable gearing 5 and is revoluble and provided with a series of revoluble lathe head spindles 6 which have chucks 7, each comprising a pair of transversely disposed rollers 8 for receiving the mitered end of a spoke 9. The tail stock 10 also revolves and is provided with a series of non-revoluble spindles 11 of the design appearing in the said former patent, and operating in the same way by the same cam means.

The cutter head 12 is of a usual design, carried on shaft 13 and disposed to turn the spokes as they are presented to it by the revolving head 4. The cutter head is provided with a series of straight blades 14 and curved blades 15 of the right contour to turn the hub end of the spoke, forming the enlarged head at that point.

It will be observed that the tapered end 9' of the spoke, being engaged by the clutch rolls 8, serves as a reference while the spoke is being turned by the cutter head.

On the bed member 2 is disposed a cutter means comprising the rotary cutter 16 carried on suitable bearings 17, 18, and disposed to cut an annular groove 19 in the spoke, thereby forming the tenon thereof. This cutter is driven by shaft 20 supported in suitable bearing 21 and connected by universal joint 22 to the spindle 16' of the cutter. A pulley 23 is on the end of the shaft 20, driven by suitable belt 24 from any source of power, which may be a pulley 25 on the cutter head shaft of the machine.

The chuck 7 is provided with projections 7' and a hook 26 is secured to the base to engage and check the same and stop the rotation in the right position to receive the tapered end of the spoke billet when it reaches the checking position, at which time the spoke is clutched by the release of the tail spindle and the spearing of the spoke by the said tail spindle.

From this statement it will be observed by considering Figs. II, III and IV that the spoke billet is chucked when the chuck is in the upper left position seen in Fig. IV. The spoke is then advanced to the cutter and is turned to the general shape as indicated in Figs. II and IV. It is then advanced to the tenon cutting cutter which cuts the annular groove forming the tenon, as seen in Figs. III and IV.

It will thus be seen that by the addition of the special chuck member to the lathe referred to and the tenon cutting device, the spoke is formed complete at a single revolution of the lathe, ready to be put into a wheel. It is finished by the mere cutting off of the tenon at the right length.

This is a general type of lathe to which the invention is applicable and of course the invention is applicable to single spindle lathes, although these would be lacking in capacity.

Having thus described the invention, what I claim as new and desire to secure by Letters Patent is:

1. The combination in a spoke lathe with multiple chuck spindles on a revolving head, of chucks comprising transversely opposed rollers to receive the tapered end of a spoke, a cutter with curved blades to form the body of the spoke, and a rotary cutter disposed to form an annular groove to form the tenon of the spoke, the said last named cutter being fixed at a specific desired distance from the chucks longitudinally of the spoke and engaging and forming the tenon by cutting laterally or from the periphery toward the axis of the spoke, so as to insure that the shoulder of the spoke shall be correctly spaced from a predetermined transverse dimension of the end of the spoke engaged by the chucks, coacting as specified.

2. The combination in a spoke lathe, of a chuck comprising transversely opposed rollers to receive the tapered end of a spoke, a cutter with curved blades to form the body of the spoke, and a rotary cutter disposed to form an annular groove to form the tenon of the spoke, the said last named cutter being fixed at a specific desired distance from the chuck longitudinally of the spoke and engaging and forming the tenon by cutting laterally or from the periphery toward the axis of the spoke, so as to insure that the shoulder of the spoke shall be correctly spaced from a predetermined tranverse dimension of the end of the spoke engaged by the chuck, coacting as specified.

3. The combination in a spoke lathe, of a chuck comprising transversely opposed rollers to receive the tapered end of a spoke, a cutter with curved blades to form the body of the spoke, and a cutter disposed to form an annular groove to form the tenon of the spoke, the said last named cutter being fixed at a specific desired distance from the chuck longitudinally of the spoke and engaging and forming the tenon by cutting laterally or from the periphery toward the axis of the spoke, so as to insure that the shoulder of the spoke shall be correctly spaced from a predetermined transverse dimension of the end of the spoke engaged by the chuck, coacting as specified.

4. The combination in a spoke lathe, of a chuck to receive the tapered end of a spoke as a reference, a cutter with curved blades to form the body of the spoke, and a cutter disposed to form an annular groove to form the tenon of the spoke, the said last named cutter being fixed at a specific desired distance from the chuck longitudinally of the spoke and engaging and forming the tenon by cutting laterally or from the periphery toward the axis of the spoke, so as to insure that the shoulder of the spoke shall be correctly spaced from a predetermined transverse dimension of the end of the spoke engaged by the chuck, coacting as specified.

In witness whereof, I have hereunto set my hand.

HENRY FLICK.